Nov. 26, 1957     G. W. CRAWLEY     2,814,445
AUTOMATIC SHOWER AND SINK TEMPERATURE CONTROL
Filed April 17, 1956     2 Sheets-Sheet 1

INVENTOR.
GLEN W. CRAWLEY,
BY
McMorrow, Berman + Davidson
ATTORNEYS.

Nov. 26, 1957 G. W. CRAWLEY 2,814,445
AUTOMATIC SHOWER AND SINK TEMPERATURE CONTROL
Filed April 17, 1956 2 Sheets-Sheet 2

INVENTOR.
GLEN W. CRAWLEY,
BY
McMorrow, Berman + Davidson
ATTORNEYS.

United States Patent Office 2,814,445
Patented Nov. 26, 1957

2,814,445

AUTOMATIC SHOWER AND SINK TEMPERATURE CONTROL

Glen W. Crawley, Borger, Tex., assignor, by decree of court, of one-half to Maxine Webster Application April 17, 1956, Serial No. 578,745

2 Claims. (Cl. 236—12)

This invention relates to devices for controlling the temperature of water flowing from faucets, shower heads, and the like, automatically, with the temperature of the flowing water being predetermined by the user through the use of settable control means.

As is well known, the temperature of water flowing from a mixing faucet, such as that provided in modern sinks or in shower installations, is difficult to control. This is particularly true in connection with shower heads, and often, after manipulation of hot and cold water faucets, one finds, after establishing in this manner the flow of water at a proper temperature, that the temperature quickly changes, either becoming too hot or too cold.

Heretofore, devices for automatically controlling the temperature of water flowing from mixing valves have been conceived, but in many instances these have been so expensive as not to be commercially feasible. In other instances, the devices have not responded with sufficient speed to provide for maintenance of the water flow at the desired temperature level. In still other instances, the devices have not been particularly efficient in maintaining the temperature during the flow, and variations in temperature have occurred, rendering the device unreliable.

In view of the above, one important object of the present invention is to provide a device of the nature referred to that will be simple, and inexpensive, thus to permit the same to be manufactured and sold at little greater cost than that involved in the manufacture and sale of an ordinary mixing valve.

Another object of importance, is to provide a device that will be fully efficient, despite its relatively low cost, in respect to adjusting automatically to changes in the relative temperatures of the water flowing therethrough.

Still another object is to provide a device which will operate efficiently without regard to the amount of water flowing therethrough, that is, the device is adapted to act efficiently regardless of the volume of the flow.

Heretofore, in the prior art devices, in many instances means for pre-selecting the desired temperature has not been provided, or alternatively, has not been particularly effective or especially well suited to shower installations. Other prior art devices of which I have knowledge, while including means for pre-selecting desired temperatures, do not provide in combination with such a means a volume control, that can be accurately and swiftly controlled by the user, and would be suitable for conventional sink or shower installations. Still further, those devices previously conceived have in many instances been excessively complex, requiring for example the holding of the water system pressure by two valves within a chamber.

Summarized briefly, the present invention includes a casing particularly adapted for installation as part of a shower assembly, although as will presently appear the device is not necessarily restricted to this use. Within the casing there is provided a bellows-type thermostat, actuating a stem in an axial direction with the stem having return movement under the force of a compression coil spring that normally opposes, adjustably, the expansion of the bellows. The stem of the thermostat is connected to a rocker arm, which when rocked in one direction opens a hot water valve while closing a cold water valve, and when rocked in the opposite direction provides for inflow of cold water accompanied by the reduction or cessation of flow of hot water.

The water flowing through the casing effects, of course, the expansion and contraction of the thermostatic bellows element, so that there is a continual maintenance of the temperature of the flowing water, the water flowing through an outlet of the casing controlled by a manually operable valve suitable for installation in shower assemblies and the like in a manner to control, through one valve means, the volume of flow in the same manner as the volume is controlled in a conventional shower or sink installation. The invention includes, in communication with the interior of the bellows, a tube connected in communication at its opposite end with a second bellows, constituting means for transmitting pressure through the tube to the interior of the first bellows. The second bellows is expanded or contracted under the control of a user, through the medium of a rotatable stem having an accessible handle.

Other objects will appear from the following description, the claims appended thereto, and from the annexed drawings in which like reference characters designate like parts throughout the several views and wherein:

Figure 1:
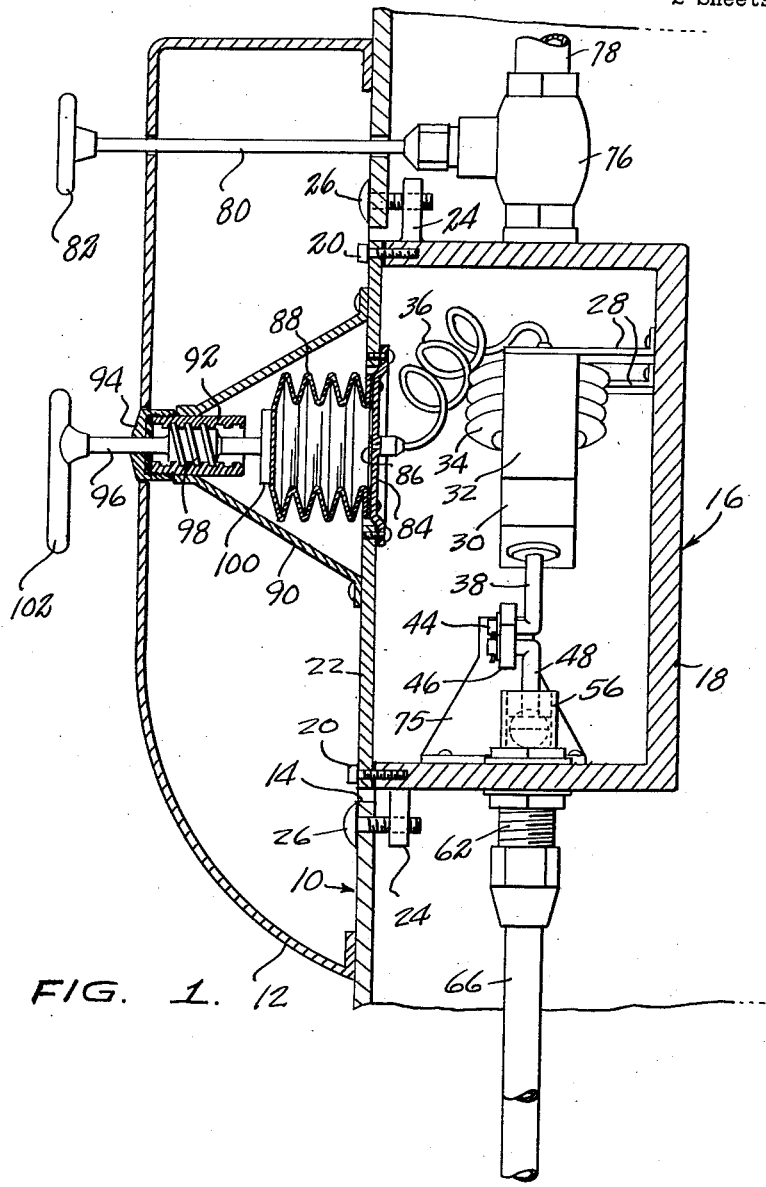
Figure 1 is a longitudinal sectional view through a device formed according to the present invention.

Referring to the drawings in detail, designated generally by the reference numeral 10 is a wall surface of a shower installation or the like, and mounted upon said wall surface is a cover plate, which may be chrome plated or otherwise treated to improve its appearance and to resist corrosion, said cover plate concealing an opening 14 formed in the wall in which opening is mounted a rectangular casing 16 formed open at its front. The casing 16 can be formed in any suitable manner, and can be bent from suitable non-corrosive sheet metal material, can be cast, or otherwise constructed, since the details of construction of the casing are at the option of a manufacturer and may be varied within the scope of the appended claims.

The casing includes a back wall 18, from which project top, bottom, and side walls. In the forward edges of the top, bottom and side walls, there are formed openings adapted to receive screws 20, passing through openings of a removable front wall or casing cover 22.

Rigid with and projecting upwardly from the casing, adjacent the opposite sides thereof (see Figure 2) are ears 24, having threaded apertures receiving bolts 26 passing through smooth-walled openings formed in the wall 10 immediately above opening 14, in registration with the apertures of the ears. A similar ear is provided at the lower end of the casing (Figure 2) in centered position between the side walls, and receives another connecting bolt 26 also passing through an opening of the wall 10. In this way, the casing is fixedly mounted within the wall, in recessed position, and will be entirely concealed by the cover plate 12. Secured to and projecting forwardly from the back wall 18 are support arms 28, 28, and secured to and depending from the support arms in an inclined position is an open bellows support frame 30, having oppositely, outwardly bowed side portions 32 providing space for a bellows 34 responding to surrounding temperatures to expand and contract. The bellows 34 is also responsive to internal pressures, and connected in communication with the upper end of the bellows is a tube 36, through which, in a manner to be presently made apparent, the interior of the bellows is charged with a predetermined amount of pressure, selected by the user.

Secured to the lower end of the bellows is a stem 38 extending axially of the bellows and sliding in a center opening provided in the lower end of the bellows support frame 30. A compression coil spring surrounds the stem 38 within the frame, abutting at one end against the lower end of the frame and at its other end against a nut 42 threaded upon the stem, the nut being adjustable longitudinally of the stem to correspondingly adjust the tension of the spring.

Stem 38, at its lower end, has a forwardly projecting finger 44, pivotally received in an opening provided in a rocker arm 46, said rocker arm being pivotally connected at its opposite ends to depending valve stems 48, 50 having at their lower ends disc-like valve heads 52, 54 axially slidable in hot and cold water inlet pipes 56, 57 formed with circular outlet openings 58, 60 in their side walls.

The conduits are provided with external threads 62, 64 at their lower ends, the threaded portions of the inlet pipes or conduits passing through openings formed in the bottom wall of the casing 18. Connecting fittings are threaded along the portions 62, 64, to connect to the inlet tubes 56, 57 hot and cold water pipes 66, 68 respectively. Nuts 70 are threaded on the portions 62, 64 against the bottom surface of the casing, cooperating with shoulders 72, 74 integrally formed upon the tubes that bear against the top surface of the bottom wall.

Figure 2:
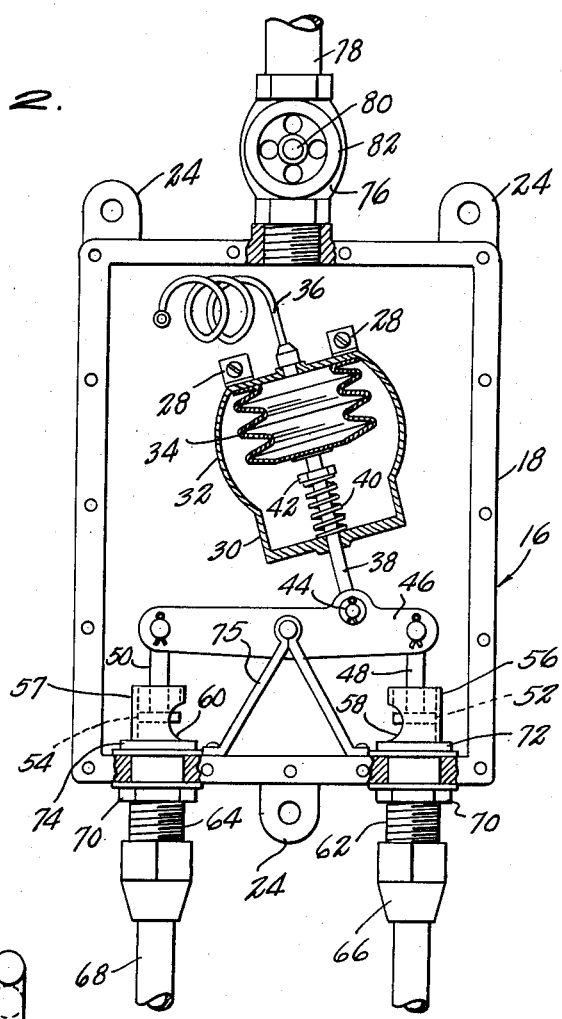
Figure 2 is a front elevational view thereof with the cover removed.
Figure 3:
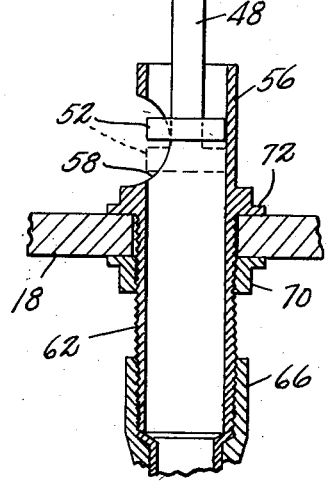
Figure 3 is a longitudinal sectional view, on an enlarged scale, through one of the inlet valve assemblies.

The rocker arm, as shown in Figure 2, is pivoted medially between its ends upon a bracket 75 of inverted U-shape mounted upon the bottom wall of the casing for movement about a horizontal axis.

From the description so far provided, it will be seen that on expansion of bellows 34, stem 38 will be shifted downwardly, and would rock arm 46 in a clockwise direction about its pivot axis, thus lowering stem 48 and raising stem 50. This tends to close hot water opening 58, while opening the cold water outlet 60. Thus, flow of cold water is reduced while flow of hot water is increased, on contraction of the bellows 34. On expansion of the bellows, caused by increase of the surrounding temperature above a predetermined value, the stem 38 is lowered, and this swings the rocker arm 46 in the mentioned clockwise direction. This causes a decrease in the flow of hot water accompanied by an increase in the flow of cold water.

Water flowing into the casing through the inlet tubes passes about the bellows, and flows out of the casing to a shower head, sink faucet or the like through a single outlet on which is mounted a valve housing 76, communicating at its inlet end with the interior of the casing and at its outlet end with a pipe 78 leading to the shower head or sink faucet. The valve housing is provided with a stem 80, which would operate the valve within the housing, said stem being rotated by a handle 82 under the control of a user. The valve within housing 76 is adapted to control the volume flow from the device, and thus by means of a single valve the volume of the outflow of the device is controlled, with said outflow being at a preset, steadily maintained temperature.

In the casing cover 22 there is formed an opening, closed by a plate 84, having a small orifice 86 connected in communication with the tube 36. The orifice opens into a manually controlled bellows 88, disposed within a tapered bellows housing 90 projecting forwardly from the casing cover. Fixedly mounted in the smaller, forward end of the housing 90 is a cylindrical sleeve 92, externally threaded at its outer end to receive a cap 94 having a center opening in which is rotatably mounted a control stem 96 formed with a coarsely threaded enlargement 98 engaging internal threads of the sleeve 92, the stem 96 having at its inner end a foot 100 bearing against the outer end of the bellows 88. A handle 102 is provided upon the outer end of the stem to provide for manual rotation of the same, and it will be understood that the handle 102 can be provided with an index arm or the like, adapted to traverse a series of indicia marked upon the cover 12, said indicia being in ascending order of value and denoting temperatures at which one may desire to set the device.

In use of the device, it will be assumed that one may desire that water flow to the shower head through the pipe 78 at a certain temperature. The control handle 102 is turned to register the index with the indicium denoting said temperature. This causes axial movement of stem 96, so as to, for example, compress the bellows 88. The increased pressure within bellows 88 is transmitted through tube 36 to the interior of the bellows 34.

In any event, in operation with the valve 76 opened to permit a selected volume of water through the outlet pipe 78, and with the internal pressure within the bellows 34 preset by means of the handle 102, water will flow inwardly through the pipes 66, 68, and will be mixed within the casing. Should the temperature surrounding the bellows 34 fall below the selected temperature, the bellows 34 will operate to admit more hot water and less cold water, shifting stem 38 in one direction. Stem 38 will be shifted in an opposite direction should the temperature surrounding the bellows 34 become higher than that desired, so as to now admit more cold water and less hot water.

The device thus provides a highly selective operation, permitting accurate control of temperature at the shower head or other water outlet. Further, the control is such as to permit the user to swiftly pre-select the temperature, and the device acts sufficiently to maintain said temperature at all times. The use of a pressure-type control means is particularly effective in insuring accurate operation of the bellows 34 in maintaining the outflow at the desired temperature, as distinguished from previous control means conceived along this line, in which various manually operable means have been employed for the same purpose.

It is believed apparent that the invention is not necessarily confined to the specific use or uses thereof described above since it may be utilized for any purpose to which it may be suited. Nor is the invention to be necessarily limited to the specific construction illustrated and described, since such construction is only intended to be illustrative of the principles it being considered that the invention comprehends any minor change in construction that may be permitted within the scope of the appended claims.

What is claimed is:

1. In combination with a wall surface having an opening therein, an upstanding casing having an open front and including a bottom wall, top wall, and rear wall, positioned inwardly of the opening so that the rear wall is spaced inwardly of the opening with the free edges of the top and bottom walls adjacent the opening, a cover closing the open front of said casing, a pair of spaced inlet pipes projecting vertically exteriorly of said bottom wall, one of said pipes being adapted for connection to a source of hot water and the other of said pipes being adapted for connection to a source of cold water, an outlet in the top wall, a valve connected to said outlet for controlling the flow of water from said outlet, a pair of upstanding tubes positioned within said casing, one of said tubes having the lower end connected in communication with one of said pipes and the other of said tubes having the lower end connected in communication with the other of said pipes, each of said tubes being provided with an outlet opening intermediate the ends thereof, a valve head positioned within each of said tubes, a stem extending vertically out of the upper end of each of said tubes and having the lower end attached to the adjacent valve head, a horizontally disposed rocker arm positioned within said casing adjacent said stem and mounted at its mid-portion within said casing for pivotal movement about a horizontal axis, the upper end of each of said stems being pivotally connected to the adjacent end of said arm, a bellows type thermostatic means positioned within said casing adjacent said arm and connected to said arm, said means being expansible and contractible responsive to changes in temperature of water flowing through said casing and responsive to internal pressures, a tube mounted within said casing and having one end connected in communication with the interior of said means, a bellows exteriorly of said cover and carried thereby, the other end of said tube being connected to the interior of said bellows, means under the control of a user and operatively connected to said bellows for selectively varying pressure within said thermostatic means to provide for expansion and contraction of said thermostatic means only responsive to temperature variations falling within a corresponding selected predetermined range, and further means under the control of a user and operatively connected to said valve for controlling the flow of water out of said outlet.

2. The combination according to claim 1 which includes in addition spring means operatively connected to said thermostatic means for urging said means away from said arm.

References Cited in the file of this patent

UNITED STATES PATENTS

| | | |
|---|---|---|
| 318,748 | Kays | May 26, 1885 |
| 586,434 | Greene | July 13, 1897 |
| 1,137,921 | Snediker | May 4, 1918 |
| 1,449,998 | Hunter | Mar. 27, 1923 |
| 1,724,504 | Murdoch | Aug. 13, 1929 |
| 2,095,358 | Dube | Oct. 12, 1937 |
| 2,296,917 | Garrett et al. | Sept. 29, 1942 |
| 2,584,420 | Branson | Feb. 5, 1952 |
| 2,587,815 | Branson | Mar. 4, 1952 |